United States Patent [19]

Nozaki et al.

[11] Patent Number: 4,733,250

[45] Date of Patent: Mar. 22, 1988

[54] RECORDING APPARATUS

[75] Inventors: Mineo Nozaki, Kawasaki; Masasumi Nagashima, Yokosuka; Yoshio Uchikata, Kawasaki; Osamu Asakura, Tokyo, all of Japan

[73] Assignee: Canon Kabushiki Kaisha, Tokyo, Japan

[21] Appl. No.: 883,435

[22] Filed: Jul. 14, 1986

Related U.S. Application Data

[63] Continuation of Ser. No. 594,861, Mar. 29, 1984, abandoned.

[30] Foreign Application Priority Data

Apr. 1, 1983 [JP] Japan .................................. 58-55159
Apr. 5, 1983 [JP] Japan .................................. 58-58715

[51] Int. Cl.⁴ ............................................. G01D 15/10

[52] U.S. Cl. ............................... 346/76 PH; 400/120

[58] Field of Search ................ 346/113, 76 R, 76 PH, 346/136; 400/44, 45, 185, 187, 120; 219/216, 216 PH

[56] References Cited

U.S. PATENT DOCUMENTS

| | | | |
|---|---|---|---|
| 4,030,588 | 6/1977 | Hanagata et al. | 346/76 PH |
| 4,443,125 | 4/1984 | Hirano | 400/120 |
| 4,444,521 | 4/1984 | Rickard et al. | 346/76 PH |
| 4,468,139 | 8/1984 | Hattori | 400/120 |
| 4,651,165 | 3/1987 | Shimada | 346/76 PH |

*Primary Examiner*—Arthur G. Evans

*Attorney, Agent, or Firm*—Fitzpatrick, Cella, Harper & Scinto

[57] ABSTRACT

A recording apparatus such as a thermal printer is compact in size and simple in construction, and has a recording head, a pulse motor commonly used for driving the head and for feeding a recording paper sheet, a cam with projections for transmitting the rotational force of the motor to the head so as to selectively move the head between the urged and separated positions with respect to the sheet or platen, ratchet gears to selectively couple the motor and a paper feed roller, and a projection and a guide roller to selectively hold the head at the separated position.

9 Claims, 4 Drawing Figures

RECORDING APPARATUS

This application is a continuation of application Ser. No. 594,861, filed Mar. 29, 1984 now abandoned.

BACKGROUND OF THE INVENTION

1. Field of the Invention

The present invention relates to a recording apparatus for recording on recording paper.

2. Description of the Prior Art

Recording apparatuses for recording characters, symbols and the like are becoming more compact and simple. However, in order to provide a recording apparatus which is both compact in size and simple in construction. many problems must still be solved.

A thermal printer with a thermal head uses a motor for feeding a paper sheet and an independent solenoid for urging the thermal head against the paper sheet. In such a thermal printer, the thermal head is brought into tight contact with or is separated from the recording paper sheet by means of a lever.

With this construction, due to an impact of the attraction of the solenoid, the thermal head is urged against the recording paper sheet with a considerable impact. This causes various problems such as contamination of the paper sheet with ink from a thermal transfer sheet or a thermal transfer ink ribbon, a large noise, a loud and heavy solenoid, a low solenoid efficiency compared to that of the motor, a high power supply voltage requirement, and an increase in the manufacturing cost.

SUMMARY OF THE INVENTION

It is an object of the present invention to provide a recording apparatus which is compact in size and is simple in construction.

It is another object of the present invention to allow a recording head to be moved from a recording position to a stand by position or vice versa with less noise and no impact.

It is still another object of the present invention to use a motor for moving a recording head in place of a solenoid so that the recording apparatus can be made compact in size and simple in construction.

It is still another object of the present invention to eliminate an impact which is generally produced when the thermal head is brought into tight contact or is separated from a recording paper sheet, so that the contamination due to such an impact can be eliminated.

It is still another object of the present invention to use a cam roller for moving the recording head so as to simplify the overall configuration of the recording apparatus.

It is still another object of the present invention to use a power source for feeding the recording paper sheet in common with a power source for moving the recording head between the recording position and the stand by position.

It is still another object of the present invention to control a sheet feed means utilizing the force of the recording head which is reciprocated along the recording paper sheet.

It is still another object of the present invention to control the sheet feed means and means for moving the recording head between the recording and stand by positions utilizing the force of the recording head reciprocated along the recording paper sheet.

The above objects and advantages of the present invention will become apparent from the following description taken in conjunction with the accompanying drawings.

DETAILED DESCRIPTION OF THE PREFERRED EMBODIMENTS

Figure 1:
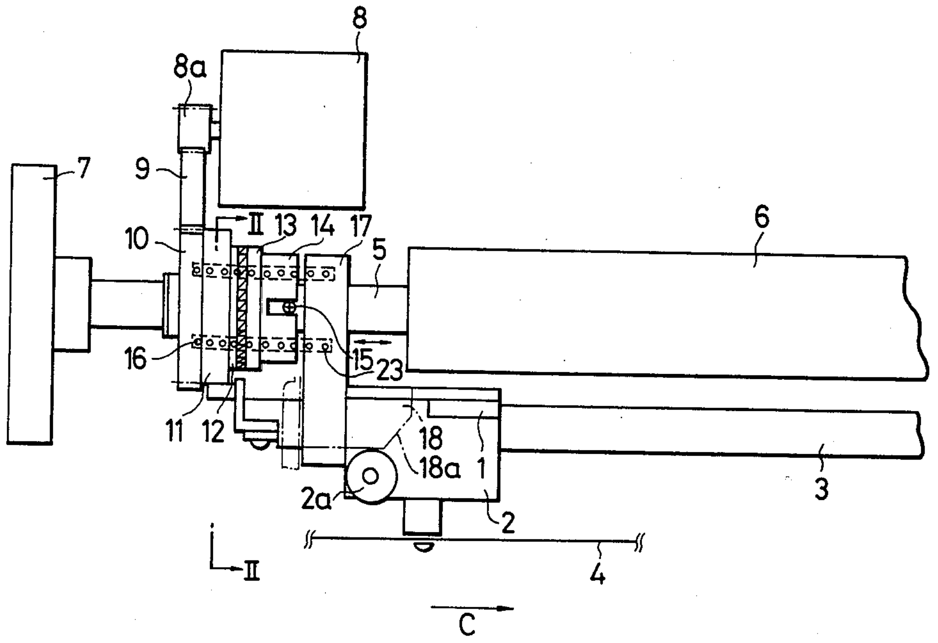
FIGS. 1 and 2 are a plan view and a sectional view, first embodiment of the present invention.
Figure 2:
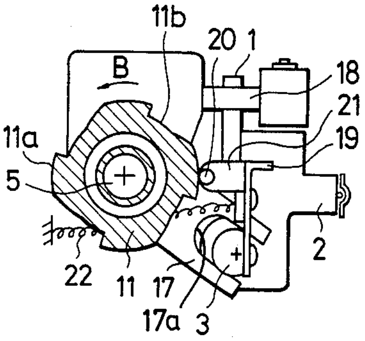

With reference to FIGS. 1 and 2, the first embodiment of the present invention now will be explained.

Referring to FIGS. 1 and 2, a thermal head 1 as a recording means has a plurality of heat-generating elements or printing elements. The printing elements print characters, symbols or the like on a recording paper sheet such as a thermal transfer sheet or a general paper sheet through a thermal transfer ribbon.

A carriage 2 having the thermal head 1 mounted thereon is slid in the right and left directions on a rotable carriage shaft 3.

With this construction, the thermal head 1 is reciprocated along the widthwise direction of the recording paper sheet therealong. A belt 4 is driven by a carriage motor (not shown) to slide the carriage 2 on the carriage shaft 3 in the right and left directions.

A paper feed roller 6 and a knob 7 are fixed on a paper feed shaft 5. Rotational force of a pulse motor to be described later is transmitted to the paper feed roller 6 so as to feed the recording paper sheet. The paper feed roller 6 carries the recording paper sheet on its one surface and serves as a platen. A pulse motor 8 serves as a drive source for feeding the paper sheet and also as a drive source for moving the thermal head 1 between a recording position at which the thermal head is urged against the recording paper sheet and a stand by position at which the thermal head 1 is separated from the recording paper sheet. A drive gear 8*a* of the pulse motor 8 serves to transmit through a transmission gear 9 the rotational force of the motor 8 to a gear 10 rotatably fitted around the paper feed shaft 5. A cam 11 is formed integrally with the gear 10. The cam 11 transmits the rotational force of the pulse motor 8 to the thermal head 1 to move the thermal head between the recording or urged position and the stand-by or separated position. For this purpose, projections 11*a* which are brought into indirect contact with the thermal head 1 are formed on the outer circumferential surface of the cam 11 at a predetermined pitch. The shape of the projections 11*a* is so determined that when the cam 11 is rotated in a direction B in FIG. 2, a pin 20 (to be described later) interlocked with the thermal head 1 follows the rotational movement of the cam 11 to be slowly moved upward first and is then abruptly dropped. With this cam 11, the thermal head 1 can be moved slowly from the urged position to the separated position but quickly from the separated position to the urged position. A ratchet gear 12 projecting toward the roller 6 is arranged integrally with that side surface of the cam 11 which is at the side of the roller 6. A ratchet gear 13 is arranged at a side surface of a slider 14 such that the ratchet gear teeth thereof oppose those of the ratchet gear 12. The ratchet gears 12 and 13 together constitute an interlocking mechanism for selectively interlocking the pulse motor 8 and the paper feed roller 6.

A spring 16 is interposed between the gear 10 and the slider 14 so that the ratchet gears 12 and 13 are normally separated from each other unless an external force acts thereon. For this reason, the rotational force of the pulse motor 8 is not normally transmitted to the roller 6.

The slider 14 having the ratchet gear 13 projects from the paper feed shaft 5 and receives its pivoting force through a pin 15 loosely fitted in a notch 14*a* formed in the slider 14. The slider 14 is slidable along the paper feed shaft 5 against the biasing force of the spring 16.

A buffer slider 17 is slidably fitted around the paper feed shaft 5. A spring 23 having a biasing force stronger than that of the spring 16 is interposed between the buffer slider 17 and the slider 14. The buffer slider 17 has a notch 17*a* at its one end. The notch 17*a* slidably receives the carriage shaft 3 therein, as shown in FIG. 2. When the carriage 2 is brought into contact with the slider 17, it is urged by the carriage 2 and is slid on the paper feed shaft 5 together with the slider 14. Then, the ratchet gears 12 and 13 mesh with each other against the biasing force of the spring 16 so that the rotational force of the pulse motor 8 is transmitted to the roller 6.

A projection 18 is fixed on the recording apparatus. The projection 18 has a tapered surface 18*a* which serves to move the carriage 2 from the recording position when the carriage 2 is brought into contact with the projection 18. The tapered surface 18*a* and a guide roller 2*a* fixed on the carriage 2 together constitute an escape mechanism wherein the tapered surface 18*a* contacts the guide roller 2*a* to hold the thermal head 1 at the separated position. In order to urge the thermal head 1 against the recording paper sheet on the paper sheet roller 6, the carriage 2 must be moved in the direction indicated by arrow C so as to release the contact between the tapered surface 18*a* and the guide roller 2*a*.

A lever 19 is fixed on the carriage shaft 3. When the control cam 11 is rotated, the lever 19 pivots the carriage 2 to transmit the force to the thermal head 1 so that the thermal head 1 is urged against or separated from the recording paper sheet.

The pin 20 is fixed on a head lever 21 which is, in turn, fixed on the lever 19. The pin 20 is urged against the cam 11 by means of a spring 22. When the pin 20 is in contact with a projection 11*a* of the cam 11, the thermal head 1 is separated from the recording paper sheet. However, when the pin 20 is dropped in a recess 11*b*, the thermal head 1 is urged against the recording paper sheet. This moving force of the thermal head 1 is provided by the spring 22.

In this manner, the cam 11, the pin 20 and the like together serve to convert the rotational force of the pulse motor 8 into a force for moving the thermal head toward or away from the recording paper sheet.

The recording apparatus of the embodiment of the present invention has the construction as described above and operates in the manner to be described below.

When the carriage 2 is at the recording position, the pulse motor 8 controls the movement of the thermal head 1 toward or away from the recording paper sheet. More specifically, rotation of the pulse motor 8 acts to rotate the gear 10 through the transmission gear 9 and to rotate the control cam 11 formed integrally with the gear 10. As described above, the pin 20 is urged against the control cam 11 by means of the spring 22. When the control cam 11 is rotated, the pin 20 contacts the projection or recess 11*a* or 11*b*.

This movement of the pin 20 is transmitted to the carriage 2 through the fixed head lever 21 and the lever 19. As a result, the carriage 2 is rotated on the carriage shaft 3. Then, the thermal head 1 is urged against or separated from the recording paper sheet. That is, when the pin 20 is in contact with a projection 11*a* of the cam 11, the thermal head 1 is separated from the recording paper sheet. However, when the pin 20 is in contact with a recess 11*b* of the cam 11, the thermal head 1 is urged against the recording paper sheet.

Accordingly, during the recording mode, the pin 20 is dropped in a recess 11*b* of the cam 11. In the non-recording skip mode, the cam 11 is rotated to bring the pin 20 into contact with a projection 11*a*. Then, the carriage 2 is fed while the thermal head 1 is separated from the recording paper sheet.

The adjustment of the feed amount of the control cam 11 can be simply performed by supplying a predetermined number of pulses to the pulse motor 8.

With this method, the thermal head 1 can be moved toward or away (up or down) from the recording paper sheet by any number of times during printing of one line.

Although power of the pulse motor 8 is transmitted to the ratchet gear 12 at this time, since the ratchet gear 12 is separated from the ratchet gear 13 of the slider 14 by means of the spring 16, the power transmitted to the ratchet gear 12 is not transmitted any further.

When the knob 17 is rotated to feed the recording paper sheet by means of the paper feed roller 6 fixed on the paper feed shaft 5, the cam 11 for controlling the movement of the thermal head 1 toward or away from the recording paper sheet is not rotated since the gear 10 is rotatably mounted on the paper feed shaft 5.

It is to be noted that the motor 8 does not become a load when the knob 7 is to be turned.

It is now assumed that the home position after recording is immediately in front of a position at which the carriage 2 contacts the tapered surface 18*a* of the projection 18. In this case, when the carriage 2 is moved to the left beyond this home position by a predetermined distance, the carriage 2 rides on the tapered surface 18*a* so that the carriage shaft 3 is rotated together with the thermal head 1.

In the case of a carriage return, the thermal head 1 is returned to the home position in the head-up state. When the carriage 2 rides over the projection 18, the cam 11 and the pin 20 are separated from each other. Then, even if the cam 11 is rotated by the pulse motor 8, the thermal head 1 is kept significantly separated from the recording paper sheet in the head-up state.

At the same position and timing at which the carriage 2 rides over the projection 18, it contacts the buffer slider 17 and is slid against the biasing force of a spring 23.

The slid buffer slider 17 moves the slider 14 toward the knob 7 along the paper feed shaft 5 through the spring 23 having a biasing force stronger than that of the spring 16.

The slider 14 then causes the ratchet gear 13 to mesh with the ratchet gear 12 which is formed integrally with the gear 10 and the cam 11.

Any further movement of the carriage 2 upon the engagement of the ratchet gears 13 and 12 is absorbed by the elasticity of the spring 23.

When the pulse motor 8 is rotated by a predetermined amount (one line) after the ratchet gears 13 and 12 engage with each other, the transmission gear 9, the gear 10, the ratchet gears 12 and 13, and the slider 14 rotate. These members then rotate the paper feed shaft 5 and the paper feed roller 6 through the pin 15 so as to feed the recording paper sheet by one line.

Even if the control cam 11 is rotated, since the pin 20 is separated from the cam 11, the thermal head 1 is kept in the head-up state and no problem is encountered in paper feed.

After the recording paper sheet is fed in this manner, the pulse motor 8 is stopped and the carriage 2 is slid to the right to the home position.

Then, the carriage 2 and the projection 18 are disengaged from each other, and the carriage 2 is rotated to return to the original position.

If the predetermined paper feed amount is set to correspond to the predetermined rotation amount of the control cam 11, even after the carriage 2 is returned to the original position, the pin 20 is urged against a projection 11*a* of the cam 11. The rotation of the carriage 2 is stopped, and the thermal head 1 is set in the separated position to wait at this position.

When the carriage 2 is slid to the right, the buffer slider 17 which has been in contact with the carriage 2 is also slid toward the roller 6 by the biasing forces of the springs 16 and 23.

Due to a difference between the biasing forces of the springs 16 and 23, the buffer slider 17 is moved first. After the spring 23 is sufficiently expanded, the slider 14 is then slid by the biasing force of the spring 16 until it is stopped by the pin 15.

When the carriage 2 reaches the home position, the ratchet gears 12 and 13 are completely disengaged from each other so that no further rotational force of the pulse motor 8 is transmitted.

At the home position, the thermal head 1 is separated from the recording paper sheet and the ratchet gears 12 and 13 are disengaged from each other. For this reason, as in the case of the recording mode, even if the knob 7 is rotated, paper feed is not disturbed and no load is experienced.

Figure 3:
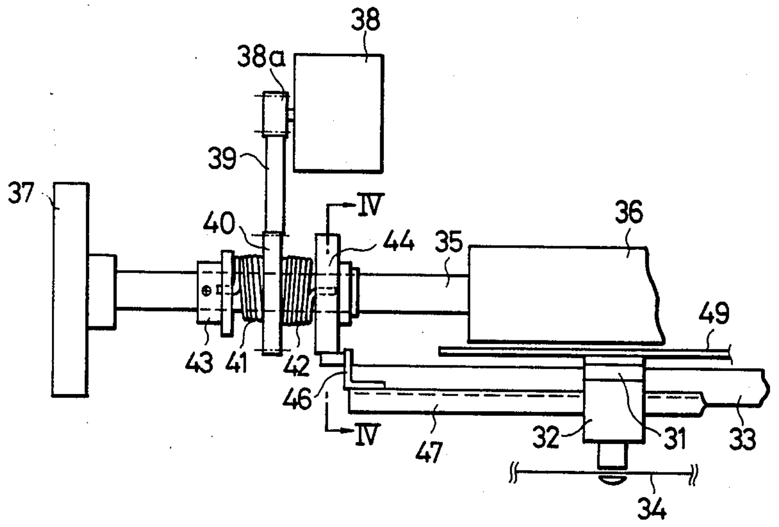
FIGS. 3 and 4 are a plan view and a sectional view, respectively, of a second embodiment of the present invention.
Figure 4:
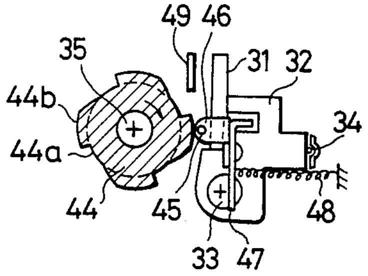

Now with reference to FIGS. 3 and 4, the second embodiment of the present invention will be explained. Referring to FIGS. 3 and 4, a thermal head 31 as a recording means has a plurality of heat generating elements or printing elements which print characters, numbers, symbols and the like on a recording paper sheet such as a thermal transfer sheet or a general paper sheet through a thermal transfer ribbon. The thermal head 31 is mounted on a carriage 32 which is slidable in the right and left directions on a rotatable carriage shaft 33. A belt 34 is driven by a carriage motor (not shown) so as to slide the carriage 32 on the carriage shaft 33 in the right and left directions.

A paper feed roller 36 and a knob 37 are fixed on a paper feed shaft 35. The rotational force of a pulse motor 38 is transmitted to a gear 40 rotatably fixed on the paper feed shaft 33 through a drive gear 38a and a transmission gear 39.

Although not shown in the drawings, the gear 40 has at its sides cylinders which are rotatably fitted around the paper feed shaft 35 and which loosely receive springs 41 and 42, respectively, therein.

The springs 41 and 42 transmit the opposite rotational forces. One end of the spring 41 located at the side of the knob 37 is fixed to a stopper 43 fixed on the paper sheet shaft 35, and the other end thereof is urged against one side surface of the gear 40 with a great frictional force. The spring 41 is wound in a direction such that it is wound tighter when the gear 40 is rotated counterclockwise as viewed from the knob 37.

One end of the spring 42 is fixed to a cam 44 rotatably supported on the paper feed shaft 35, and the other end thereof is urged against the other side surface of the gear 40. The spring 42 is wound in a direction such that it is wound tighter when the gear 40 is rotated clockwise as viewed from the side of the knob 37.

The cam has recesses 44*a* and projections 44*b* at a predetermined pitch, as shown in FIG. 4.

A pin 45 is fixed to a lever 46. Another lever 47 is fixed to the carriage shaft 33. Since the lever 47 is also fixed on the lever 46, the pin 45 is urged against the cam 44 by a spring 48 urging the lever 47.

The carriage 32 can slide on the carriage shaft 33. The rotational movement of the carriage 32 is regulated by the lever 47 coaxial therewith, and the carriage 32 is normally urged against a platen 49 by the spring 48.

The rotation of the carriage 32 is controlled by the cam 44. When the pin 45 is dropped in a recess 44*a* of the cam 44, the carriage 32 is rotated counterclockwise (FIG. 4). Then, when the thermal head 31 on the carriage 32 is urged against the platen 49, the rotation of the carriage 32 is stopped. The urging force of the thermal head 31 against the platen 49 is determined by the biasing force of the spring 48.

When the pin 45 is on a projection 44*b*, the rotation of the lever 46 having the pin 45 fixed thereon serves to set the thermal head 31 at a position separated from the platen 49 through the carriage shaft 33 and the carriage 32.

The paper feed and thermal head urging operations in the recording apparatus of the construction described above will now be described.

In the recording mode, the pulse motor 38 serves to move the thermal head 31 toward or away from the platen 49. More specifically, when the pulse motor 38 is rotated clockwise as viewed from the knob 37, the gear 40 is rotated clockwise through the transmission gear 39. Then, the spring 42 at the right of the gear 40 serves as a one way spring clutch which receives the rotational force in the tightening direction and transmits it to the cam 44. The spring 41 at the left of the gear 40 also serves as a one way spring clutch. However, since the spring 41 receives a loosening rotational force, the paper feed roller 36 remains stationary.

When a recording or printing command is received, since the pin 45 is in contact with a projection 44*b* of the cam 44, the thermal head 31 is separated from the platen 49. When a predetermined number of pulses are supplied to the pulse motor 38 to drive it clockwise in this condition, the cam 44 is rotated by a predetermined angular interval and then stops. Then, the pin 45 is dropped in the next recess 44*a* of the cam 44.

Upon this operation, the thermal head 31 is urged against the platen 49 by the spring 48 through the levers 46 and 47, the carriage shaft 33, and the carriage 32. The recording apparatus is thus set in the recording mode. For higher recording precision, a switch (not shown) interlocked with the lever 47 can be used to detect the urged state of the thermal head 31 against the platen 49 during recording.

In the skip mode where the blank portion is long and the ribbon feed is stopped to save ribbon consumption, the pulse motor 38 is rotated further in the same direction so as to separate the thermal head 31 from the platen 49.

While the thermal head 31 is urged against the platen 49, the thermal head 31 is moved along the carriage shaft 33 so as to sequentially print on the recording paper sheet. In order to separate the thermal head 31 from the platen 49 after recording, the pulse motor 38 is rotated clockwise for a predetermined angular interval so as to bring the pin 45 into contact with a projection **44*b* of the cam 44 and to stop the rotation of the cam 44**.

When the thermal head 31 is separated from the platen 49 after recording, a number of pulses corresponding to a paper feed amount are supplied to the pulse motor 38 so as to drive it counterclockwise.

Rotation of the pulse motor 38 rotates the transmission gear 39 and the gear 40. The spring 41 on the gear shaft receives the tightening force to rotate together with the gear 40. This rotates the stopper 43 having one end coupled to the spring 41, the paper feed shaft 35 having the stopper 43 fixed thereon, and the paper feed roller 36 so as to feed the recording paper sheet by a distance corresponding to one line.

On the other hand, the spring 42 at the right of the gear 40 receives the loosening force and does not transmit with the rotational force. Therefore, the spring 42 and the cam 44 remain stationary and do not bring about any change in the position of the thermal head 31.

When it is desired to feed the recording paper sheet further, it can be easily performed by rotating the pulse motor 38 counterclockwise.

When a recording command is received in the stand by mode after the paper is fed, the above cycle is repeated.

In this manner, the thermal head can be urged against or separated from the platen through the cam. Therefore, no impact acts on the thermal head, so that no noise is generated and contamination by the thermal transfer sheet or thermal transfer ink ribbon is prevented.

Since a solenoid is not required, the power supply can be made compact in size and can be reduced in cost.

What is claimed is:

1. Recording apparatus comprising:

recording means for recording on a recording sheet;

conveying means for conveying the recording sheet;

driving means for selectively driving a first transmitting means and a second transmitting means, wherein said first transmitting means transmits a driving force of said driving means to said recording means during a recording operation such that said recording means may be displaced between a recording position where the recording means records on the recording sheet and a stand-by position where the recording means is separated from the recording position and said second transmitting means transmits the drive force of said driving means to said conveying means such that said conveying means may convey the recording sheet; and selecting means for selectively transmitting the drive force of said driving means to said first transmitting means and said second transmitting means such that said recording means may assume at different times the recording position and at other times the stand-by position during the recording operation, and such that said conveying means may convey the recording sheet, respectively.

2. Recording apparatus according to claim 1, wherein said recording means comprising a thermal head.

3. Recording apparatus according to claim 1, wherein said first transmitting means includes a cam driven by a motor, said recording means being moved between the recording and stand-by positions by following a cam surface of said cam.

4. Recording apparatus according to claim 3, wherein said cam surface of said first transmitting means including a cam driven by a motor, said recording means being moved between the recording and stand-by positions by following said cam surface.

5. Recording apparatus according to claim 3, wherein a plurality of projections for moving said recording means are formed at a predetermined pitch on said cam surface of said cam.

6. Recording apparatus comprising:

recording means for recording on a recording sheet;

conveying means for conveying the recording sheet;

driving means for selectively driving a first transmitting means and a second transmitting means, wherein said first transmitting means transmits a drive force of said driving means to said recording means during a recording operation such that such recording means may be displaced between a recording position where the recording means records on the recording sheet and a stand-by position where the recording means is separated from the recording position and said second transmitting means transmits the driving force of said driving means to said conveying means such that said conveying means may convey the recording sheet;

selecting means for selectively transmitting the drive force of said driving means to said first transmitting means and said second transmitting means such that said recording means may assume at different times the recording position and at other times the stand-by position during the recording operation, and such that said conveying means may convey the recording sheet, respectively; and reciprocating means cooperating with said recording means for reciprocally moving said recording means along a conveyance path of the recording sheet during the recording operation.

7. Recording apparatus according to claim 6, wherein said first transmitting means includes a cam driven by a motor, said recording means being moved between the recording and stand-by positions by following a cam surface of said cam.

8. Recording apparatus according to claim 7, wherein said cam surface of said cam has a shape such that said recording means is moved gradually from the recording position to the stand-by position and quickly from the stand-by position to the recording position.

9. Recording apparatus according to claim 7, wherein a plurality of projections for moving said recording means are formed at a predetermined pitch on said cam surface.

* * * * *

UNITED STATES PATENT AND TRADEMARK OFFICE

CERTIFICATE OF CORRECTION

PATENT NO. : 4,733,250

DATED : March 22, 1988

INVENTOR(S) : MINEO NOZAKI, ET AL.

It is certified that error appears in the above-identified patent and that said Letters Patent is hereby corrected as shown below: On The Title Page:

AT [56] IN THE REFERENCES

Foreign Patents, insert: --55617 European 346/76PH--.

COLUMN 1

Line 27, "large" should read --loud--.
Line 27, "loud" should read --large--.
Line 38, "stand by" should read --stand-by--.
Line 56, "stand by" should read --stand-by--.
Line 64, "stand by" should read --stand-by--.

COLUMN 2

Line 5, "sectional view," should read --sectional view, respectively, of a--.
Line 39, "stand by" should read --stand-by--.

COLUMN 4

Line 31, "knob 17" should read --knob 7--.

COLUMN 5

Line 60, "shaft 33" should read --shaft 35--.

COLUMN 6

Line 1, "sheet" should read --feed--.

UNITED STATES PATENT AND TRADEMARK OFFICE

CERTIFICATE OF CORRECTION

PATENT NO. : 4,733,250

DATED : March 22, 1988

INVENTOR(S) : MINEO NOZAKI, ET AL.

It is certified that error appears in the above-identified patent and that said Letters Patent is hereby corrected as shown below:

COLUMN 7

Line 25, "with" should be deleted.
Line 31, "stand" should read --stand- --.

COLUMN 8

Line 5, "comprising" should read --comprises--.
Line 12, "includ-" should read --includes--.
Line 13, "ing" should be deleted.
Line 27, "that such" should read --that said--.

Signed and Sealed this

First Day of November, 1988

*Attest:*

DONALD J. QUIGG

*Attesting Officer* *Commissioner of Patents and Trademarks*